United States Patent
Berger et al.

(10) Patent No.: US 11,974,299 B2
(45) Date of Patent: Apr. 30, 2024

(54) TECHNIQUES FOR TRANSMITTING A COMMUNICATION BASED AT LEAST IN PART ON AN AVERAGE ENVIRONMENTAL CHANNEL ESTIMATION

(71) Applicant: QUALCOMM Incorporated, San Diego, CA (US)

(72) Inventors: Peer Berger, Hod Hasharon (IL); Shay Landis, Hod Hasharon (IL); Lior Uziel, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 17/229,227

(22) Filed: Apr. 13, 2021

(65) Prior Publication Data

US 2022/0330207 A1 Oct. 13, 2022

(51) Int. Cl.
| | |
|---|---|
| *H04W 72/30* | (2023.01) |
| *H04W 4/40* | (2018.01) |
| *H04L 1/00* | (2006.01) |
| *H04W 8/24* | (2009.01) |
| *H04W 72/02* | (2009.01) |

(52) U.S. Cl.
CPC .......... *H04W 72/30* (2023.01); *H04L 1/0003* (2013.01); *H04W 4/40* (2018.02); *H04W 8/24* (2013.01); *H04W 72/02* (2013.01)

(58) Field of Classification Search
CPC ....... H04W 72/005; H04W 4/40; H04W 8/24; H04W 72/02; H04L 1/0003
See application file for complete search history.

(56) References Cited

U.S. PATENT DOCUMENTS

| | | | | |
|---|---|---|---|---|
| 2015/0195819 A1* | 7/2015 | Kwon | ................... | H04L 1/0016 370/329 |
| 2018/0294935 A1* | 10/2018 | Uchiyama | ............. | H04W 72/20 |
| 2021/0105728 A1 | 4/2021 | Nguyen et al. | | |
| 2021/0385684 A1* | 12/2021 | Rajab | ................ | H04W 28/0289 |
| 2022/0006673 A1* | 1/2022 | Schelstraete | ...... | H04L 25/03057 |
| 2022/0110067 A1* | 4/2022 | Ryu | ...................... | H04W 24/08 |
| 2022/0255699 A1* | 8/2022 | Lin | ..................... | H04W 52/282 |

OTHER PUBLICATIONS

Intel Corporation: "Sidelink Physical Structure for NR V2X Communication", 3GPP TSG RAN WG1 Meeting #99, R1-1913255, 3rd Generation Partnership Project, Mobile Competence Centre, 650, Route Des Lucioles, F-06921, Sophia-Antipolis Cedex, France, vol. RAN WG1, No. Reno, Nevada, USA, Nov. 18, 2019-Nov. 22, 2019, Nov. 15, 2019, XP051825704, pp. 1-36.

(Continued)

*Primary Examiner* — Won Tae C Kim
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may configure one or more transmission parameters based at least in part on an average channel condition estimate for a broadcast channel, wherein the broadcast channel is for broadcast communications or groupcast communications for multiple mobile UEs. The UE may transmit a broadcast communication or a groupcast communication using the one or more transmission parameters. Numerous other aspects are described.

30 Claims, 8 Drawing Sheets

(56) References Cited

OTHER PUBLICATIONS

Intel Corporation: "NR V2X Sidelink Physical Layer Procedures", 3GPP TSG RAN WG1 Meeting #98, R1-1908638, Intel—EV2X SL L1 Procedure, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, XP051765246, 16 pages.
International Search Report and Written Opinion—PCT/US2022/071096—ISA/EPO—dated Jun. 24, 2022.
Samsung: "DMRS Enhancement for PSSCH", 3GPP TSG RAN WG1 #84, R1-160572 DMRS PSSCH, 3rd Generation Partnership Project, Mobile Competence Centre, 650, Route Des Lucioles, F-06921 Sophia-Antipolis Cedex, France, vol. RAN WG1, No. St Julians, Malta, Feb. 15, 2016-Feb. 19, 2016, Feb. 6, 2016, pp. 1-4, XP051064226.

\* cited by examiner

TECHNIQUES FOR TRANSMITTING A COMMUNICATION BASED AT LEAST IN PART ON AN AVERAGE ENVIRONMENTAL CHANNEL ESTIMATION

FIELD OF THE DISCLOSURE

Aspects of the present disclosure generally relate to wireless communication and to techniques and apparatuses for transmitting a communication based at least in part on an average environmental channel estimation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" (or "forward link") refers to the communication link from the base station to the UE, and the "uplink" (or "reverse link") refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes configuring one or more transmission parameters based at least in part on an average channel condition estimate for a broadcast channel, wherein the broadcast channel is for broadcast communications or groupcast communications for multiple mobile UEs; and transmitting a broadcast communication or a groupcast communication using the one or more transmission parameters.

In some aspects, the one or more transmission parameters comprise a modulation and coding scheme for application to the broadcast communication or the groupcast communication.

In some aspects, the method includes receiving one or more communications via the broadcast channel; determining a time coherency associated with the one or more communications; and determining the average channel condition estimate based at least in part on the time coherency associated with the one or more communications.

In some aspects, reception of the one or more communications via the broadcast channel comprises one or more of: receiving the one or more communications via a single mobile UE, receiving the one or more communications via a plurality of mobile UEs, or receiving the one or more communications via one or more mobile UEs within a group associated with a groupcast communication.

In some aspects, the determination of the time coherency is based at least in part on coherency between demodulation reference signals of the one or more communications.

In some aspects, the method includes selecting the one or more transmission parameters, from a set of candidate transmission parameters, based at least in part on: a throughput associated with the one or more transmission parameters, and the average channel condition estimate supporting the one or more transmission parameters.

In some aspects, the broadcast channel is associated with a vehicle-to-everything (V2X) network.

In some aspects, the method includes determining to configure the one or more transmission parameters based at least in part on the average channel condition estimate, based at least in part on one or more of: capabilities of the UE, a self-speed of the UE, or a number of communications, associated with a determination of the average channel condition estimate, received within a threshold amount of time.

In some aspects, a UE for wireless communication includes a memory, and one or more processors, coupled to the memory, configured to: configure one or more transmission parameters based at least in part on an average channel condition estimate for a broadcast channel, wherein the broadcast channel is for broadcast communications or groupcast communications for multiple mobile UEs; and transmit a broadcast communication or a groupcast communication using the one or more transmission parameters.

In some aspects, the one or more transmission parameters comprise a modulation and coding scheme for application to the broadcast communication or the groupcast communication.

In some aspects, the one or more processors are further configured to: receive one or more communications via the broadcast channel; determine a time coherency associated with the one or more communications; and determine the average channel condition estimate based at least in part on the time coherency associated with the one or more communications.

In some aspects, reception of the one or more communications via the broadcast channel comprises one or more of: receiving the one or more communications via a single mobile UE, receiving the one or more communications via a plurality of mobile UEs, or receiving the one or more communications via one or more mobile UEs within a group associated with a groupcast communication.

In some aspects, the determination of the time coherency is based at least in part on coherency between demodulation reference signals of the one or more communications.

In some aspects, the one or more processors are further configured to select the one or more transmission parameters, from a set of candidate transmission parameters, based at least in part on: a throughput associated with the one or more transmission parameters, and the average channel condition estimate supporting the one or more transmission parameters.

In some aspects, the broadcast channel is associated with a V2X network.

In some aspects, the one or more processors are further configured to: determine to configure the one or more transmission parameters based at least in part on the average channel condition estimate, based at least in part on one or more of: capabilities of the UE, a self-speed of the UE, or a number of communications, associated with a determination of the average channel condition estimate, received within a threshold amount of time.

In some aspects, a non-transitory computer-readable medium storing a set of instructions for wireless communication includes one or more instructions that, when executed by one or more processors of a UE, cause the UE to: configure one or more transmission parameters based at least in part on an average channel condition estimate for a broadcast channel, wherein the broadcast channel is for broadcast communications or groupcast communications for multiple mobile UEs; and transmit a broadcast communication or a groupcast communication using the one or more transmission parameters.

In some aspects, the one or more transmission parameters comprise a modulation and coding scheme for application to the broadcast communication or the groupcast communication.

In some aspects, the one or more instructions further cause the UE to: receive one or more communications via the broadcast channel; determine a time coherency associated with the one or more communications; and determine the average channel condition estimate based at least in part on the time coherency associated with the one or more communications.

In some aspects, the one or more instructions further cause the UE to: receive the one or more communications via a single mobile UE, receive the one or more communications via a plurality of mobile UEs, or receive the one or more communications via one or more mobile UEs within a group associated with a groupcast communication.

In some aspects, the determination of the time coherency is based at least in part on coherency between demodulation reference signals of the one or more communications.

In some aspects, the one or more instructions further cause the UE to select the one or more transmission parameters, from a set of candidate transmission parameters, based at least in part on: a throughput associated with the one or more transmission parameters, and the average channel condition estimate supporting the one or more transmission parameters.

In some aspects, the one or more instructions further cause the UE to: determine to configure the one or more transmission parameters based at least in part on the average channel condition estimate, based at least in part on one or more of: capabilities of the UE, a self-speed of the UE, or a number of communications, associated with a determination of the average channel condition estimate, received within a threshold amount of time.

In some aspects, an apparatus for wireless communication includes means for configuring one or more transmission parameters based at least in part on an average channel condition estimate for a broadcast channel, wherein the broadcast channel is for broadcast communications or groupcast communications for multiple mobile UEs; and means for transmitting a broadcast communication or a groupcast communication using the one or more transmission parameters.

In some aspects, the one or more transmission parameters comprise a modulation and coding scheme for application to the broadcast communication or the groupcast communication.

In some aspects, the apparatus includes means for receiving one or more communications via the broadcast channel; means for determining a time coherency associated with the one or more communications; and means for determining the average channel condition estimate based at least in part on the time coherency associated with the one or more communications.

In some aspects, the apparatus includes means for receiving the one or more communications via a single mobile UE, means for receiving the one or more communications via a plurality of mobile UEs, or means for receiving the one or more communications via one or more mobile UEs within a group associated with a groupcast communication.

In some aspects, the determination of the time coherency is based at least in part on coherency between demodulation reference signals of the one or more communications.

In some aspects, the apparatus includes means for selecting the one or more transmission parameters, from a set of candidate transmission parameters, based at least in part on: a throughput associated with the one or more transmission parameters, and the average channel condition estimate supporting the one or more transmission parameters.

In some aspects, apparatus includes means for determining to configure the one or more transmission parameters based at least in part on the average channel condition estimate, based at least in part on one or more of: capabilities of the UE, a self-speed of the UE, or a number of communications, associated with a determination of the average channel condition estimate, received within a threshold amount of time.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
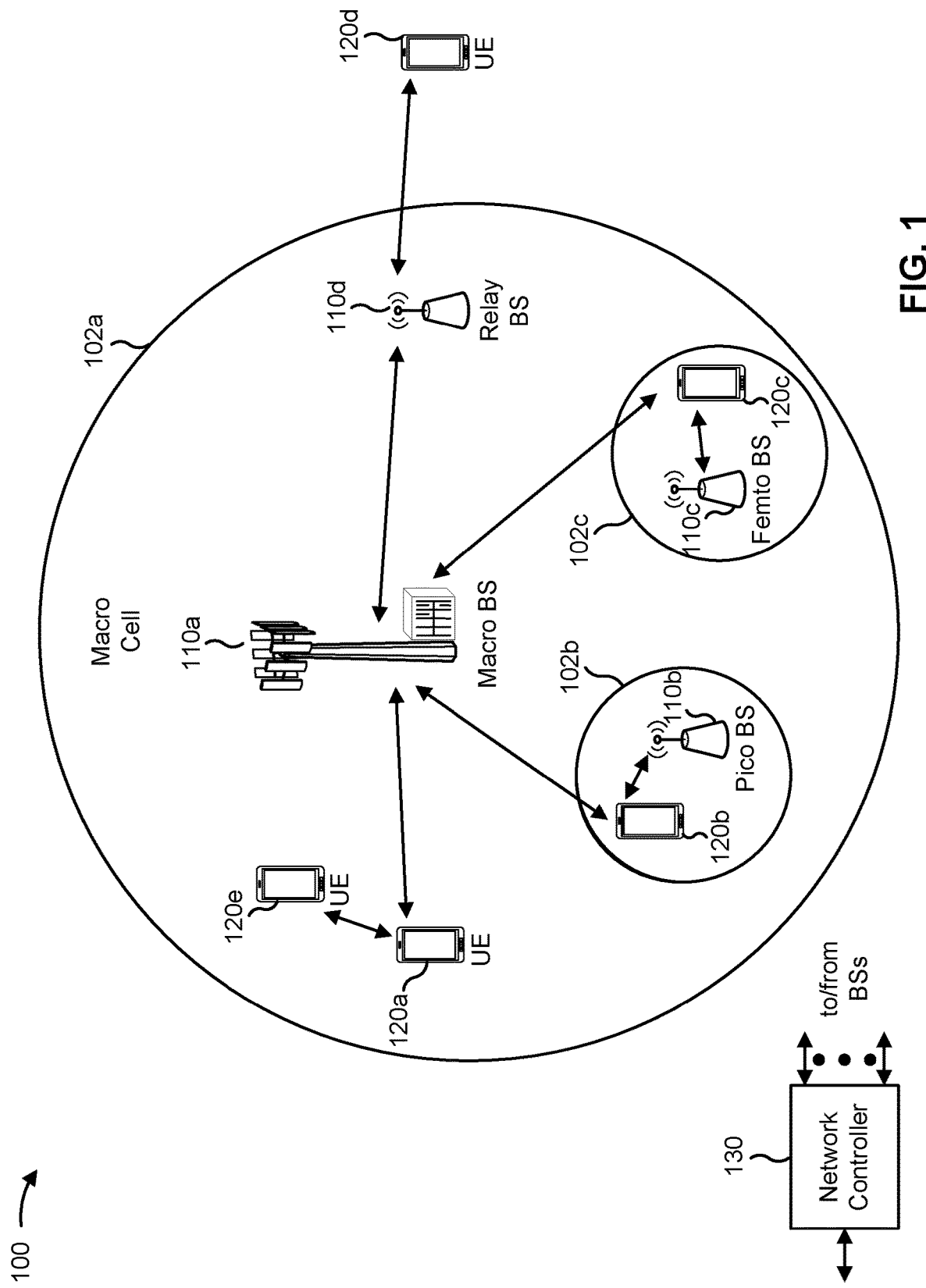
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
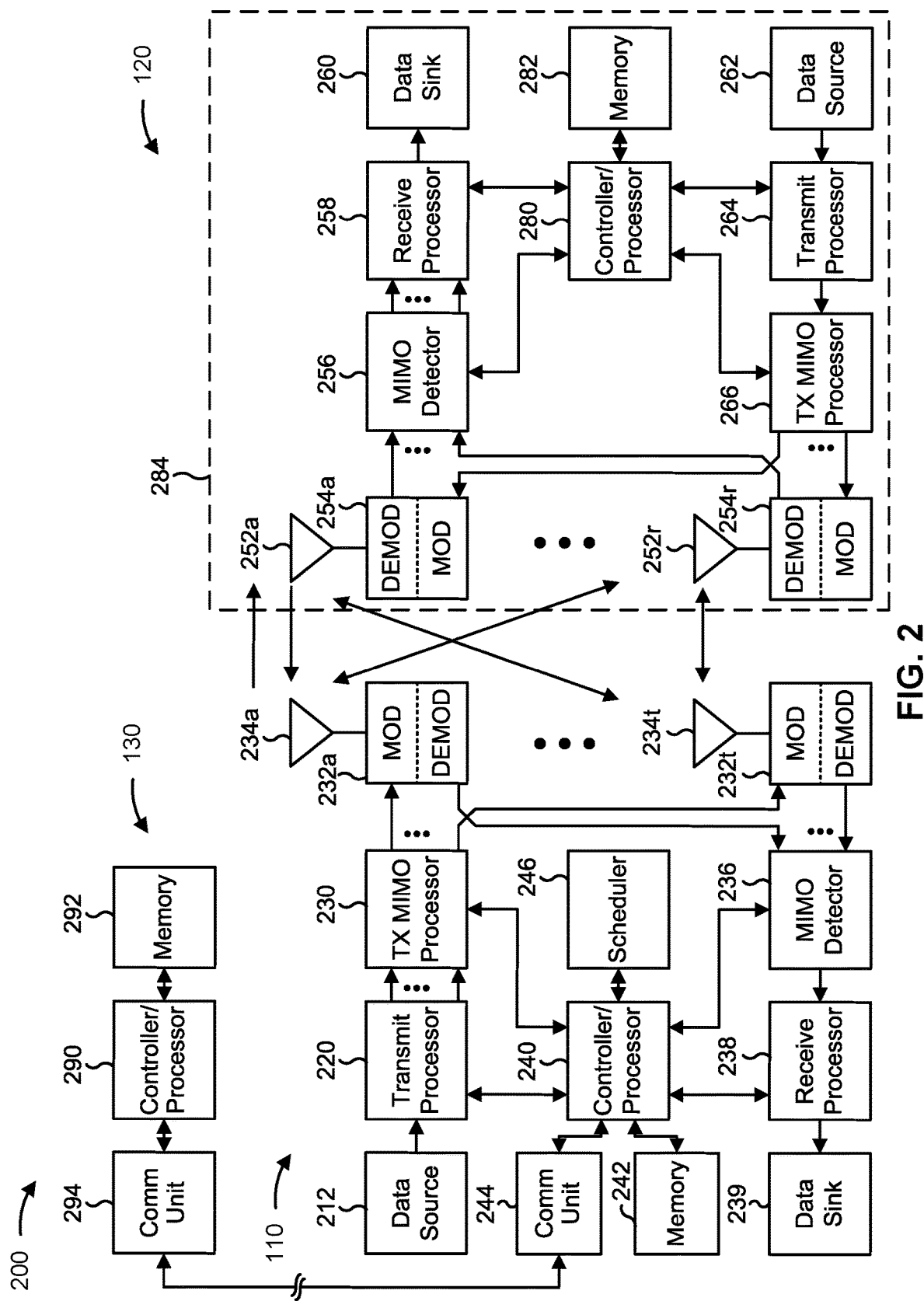
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with transmitting a communication based at least in part on an average environmental channel estimation, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include running the instructions, converting the instructions, compiling the instructions, and/or interpreting the instructions.

In some aspects, the UE includes means for configuring one or more transmission parameters based at least in part on an average channel condition estimate for a broadcast channel, wherein the broadcast channel is for broadcast communications or groupcast communications for multiple mobile UEs; and/or means for transmitting a broadcast communication or a groupcast communication using the one or more transmission parameters. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
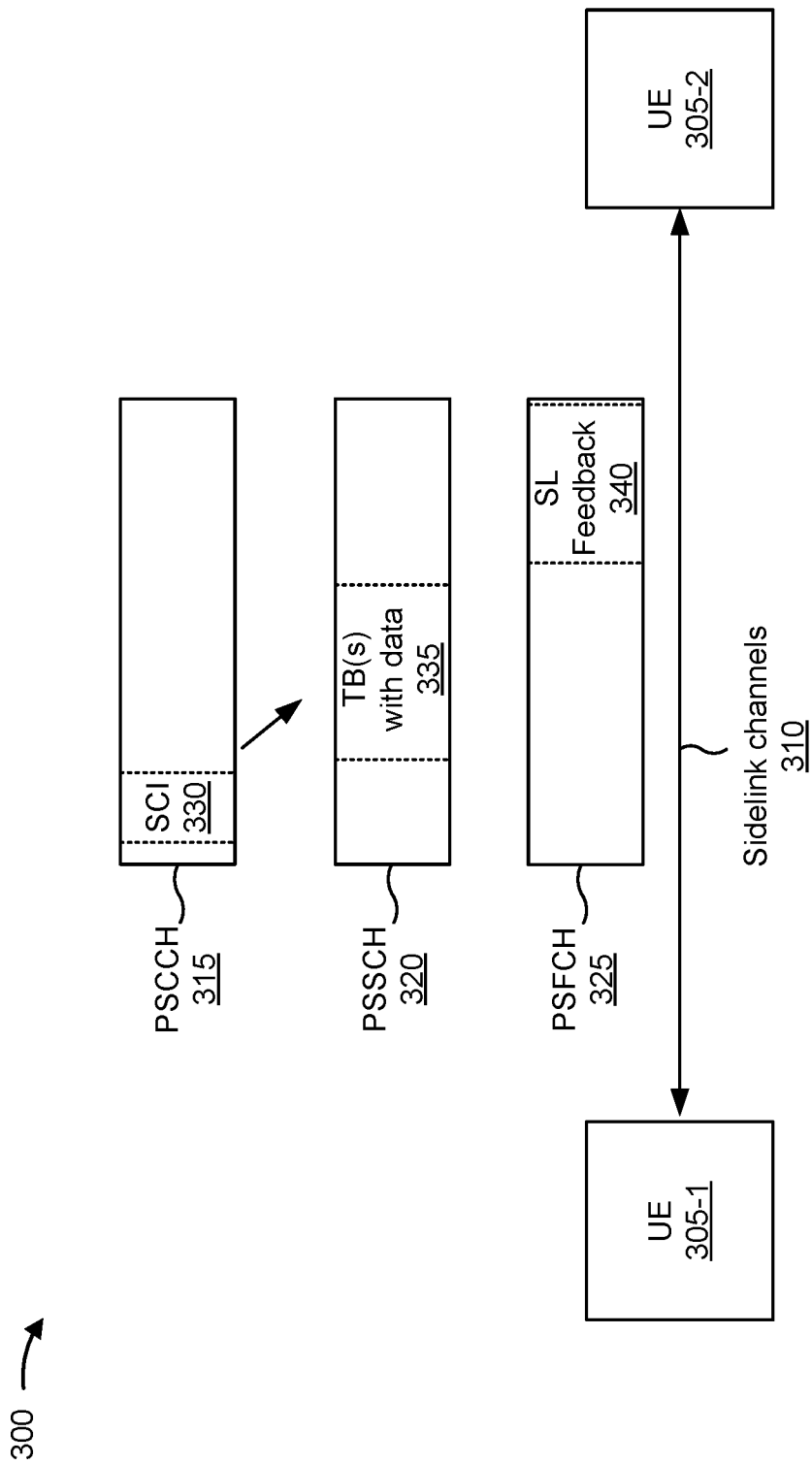
FIGS. 3 and 4 are a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
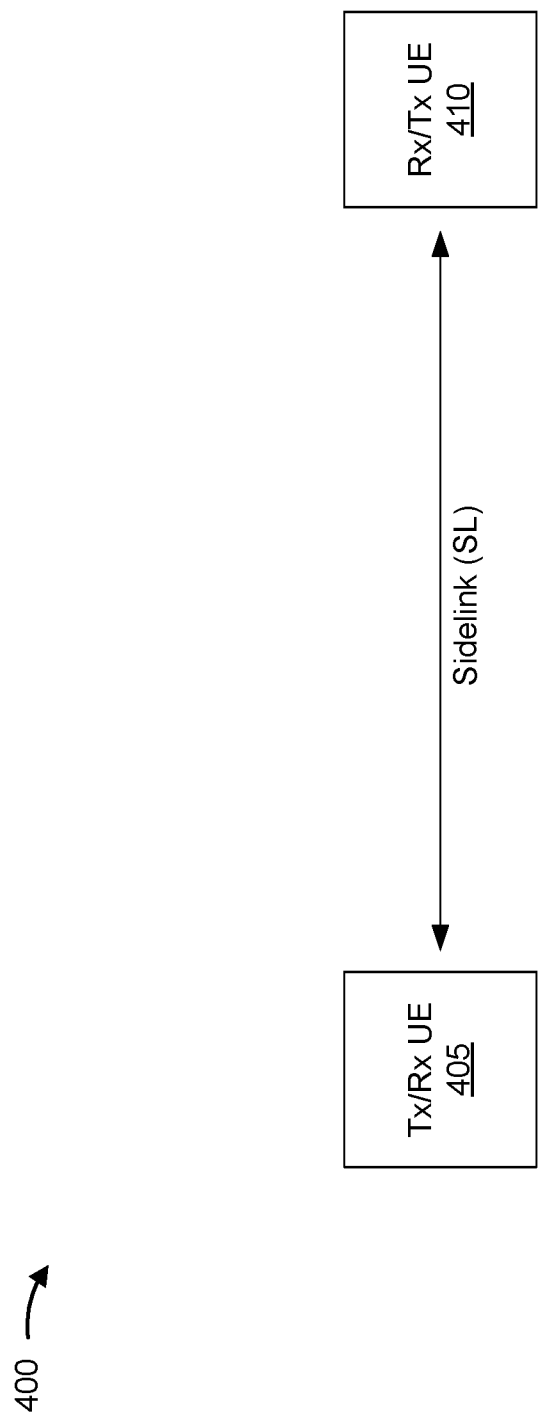

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, "sidelink" may refer to a direct link between UEs 120, and "access link" may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
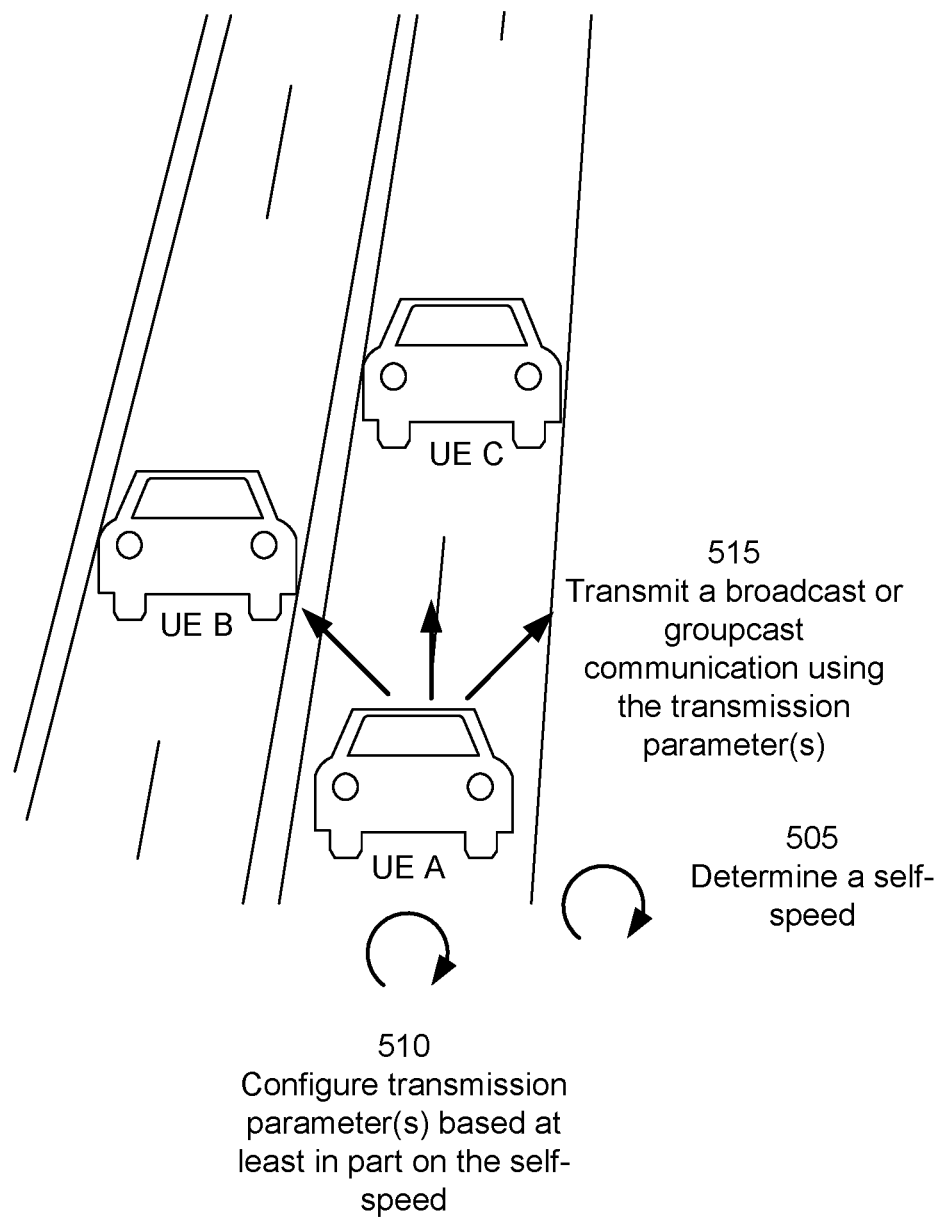
FIG. 5 is a diagram illustrating an example associated with transmitting a communication based at least in part on a self-speed, in accordance with the present disclosure.

FIG. 5 is a diagram illustrating an example 500 associated with transmitting a communication based at least in part on a self-speed, in accordance with the present disclosure. As shown in FIG. 5, a UE A, a UE B, and a UE C may be present in a network environment (e.g., a sidelink network).

As shown by reference number 505, a UE A may determine a self-speed of the UE. The self-speed of the UE may be a speed relative a surface on which the UE is traveling. The UE A may determine the self-speed based at least in part on a global positioning system (GPS) component, independent GPS device associated with the UE A, a global navigation satellite system (GNSS) component, and/or an independent GNSS device. The UE A may determine the self-speed based at least in part on changes in GPS locations over an interval of time. Alternatively, the UE A may determine the self-speed based at least in part on a speedometer or other device that determines the self-speed based at least in part on a configuration of a vehicle (e.g., a wheel circumference) associated with the UE A and/or a metric associated with movement of the vehicle (e.g., an axel rotation rate). In another example, the UE A may use a radar, a lidar, and/or a camera, among other examples, to determine the self-speed of the UE A.

As shown by reference number 510, the UE may configure one or more transmission parameters based at least in part on the self-speed. For example, the UE may configure the one or more transmission parameters to account for a likelihood of Doppler spread and/or Doppler shift that is based at least in part on a speed of the UE relative to the surface on which the UE is traveling. The UE may use transmission parameters associated with robustness when self-speed is high (e.g., high robustness and low throughput for high speed, low robustness and high throughput for low speed, and/or medium robustness and medium throughput for medium speed).

As shown by reference number 515, the UE A may transmit a broadcast or groupcast (e.g., a multicast) communication using the one or more transmission parameters. The UE B and the UE C may receive the broadcast or groupcast communication based at least in part on a robustness of the transmission parameters and relative speeds with the UE A, among other conditions.

As indicated above, FIG. 5 is provided as an example. Other examples may differ from what is described with respect to FIG. 5.

As described above, a UE may configure transmission parameters, for a broadcast or groupcast communication, based at least in part on a self-speed of the UE. For example, in a cellular V2X (C-V2X) network, the UE may configure a relatively high MCS (e.g., high throughput and low robustness) when the UE has a relatively low self-speed, and may configure a relatively low MCS (e.g., low throughput and high robustness) when the UE has a relatively high self-speed. The UE may select the MCS in this way to reduce communication errors that may originate based at least in part on channel effects from relative speeds between a transmitting device and a receiving device, such as Doppler shift and/or Doppler spread.

However, if the UE has a relatively high self-speed and additional mobile UEs have a similarly high self-speed in a generally same direction, the UE may configure a relatively low MCS, even though a relative speed between the UE and the additional mobile UEs is relatively low. Additionally, or alternatively, the UE may select a relatively low MCS based at least in part on self-speed when the UE has line of sight to the one or more additional mobile UEs. When the UE has line of sight to the one or more additional mobile UEs, a relatively low MCS may be unnecessary based at least in part on a relative speed not significantly affecting a Doppler spread and/or a time coherency and/or based at least in part on use of solutions, such as frequency offset corrections, to correct for Doppler shift. In this way, the UE may communicate with spectral inefficiencies, based at least in part on using transmission parameters that are configured for high-relative speed communications.

In some aspects described herein, a UE may determine an average channel condition estimate (e.g., an average environmental channel estimate) for a broadcast channel. The UE may determine the average channel condition estimate based at least in part on receiving one or more communications via the broadcast channel and determining a time coherency associated with the one or more communications. The UE may determine a time coherency based at least in part on, for example, demodulation reference signals (DMRSs) within the one or more communications. The time coherency may indicate coherency over a single communication, over multiple communications from a single mobile UE, and/or over communications from multiple UEs.

A time coherency of the broadcast channel may be a value based at least in part on a combination of multiple time coherencies. For example, the time coherency of the broadcast channel may be based at least in part on an average (e.g., balanced or weighted) of all time coherencies within a time period and/or an average (e.g., balanced or weighted) of time coherencies of subsets of the time period, among other examples. The time coherencies and/or the time coherency of the broadcast channel may be a parameter of a set of parameters associated with determining the average channel condition estimate.

In some aspects, the UE may determine the broadcast channel to be coherent based at least in part on a coherency of the broadcast channel satisfying a threshold (e.g., 0.5 correlation). In some aspects, the UE may determine different levels of coherency based at least in part on multiple thresholds.

In some aspects, the UE may be configured to select the average channel condition estimate or a self-speed to select the one or more transmission parameters. For example, based at least in part on receiving a number of communications, that satisfies a threshold, within a time window, the UE may use the average channel condition estimate to select the one or more transmission parameters. Alternatively, based at least in part on receiving a number of communications, that fails to satisfy the threshold, within the time window, the UE may use the self-speed to select the one or more transmission parameters.

Based at least in part on the UE selecting one or more transmission parameters based at least in part on the average channel condition estimate instead of self-speed, the UE may select higher throughput transmission parameters when the average channel condition estimate indicates that the broadcast channel supports the higher throughput transmission parameters, even if a self-speed is relatively high. In this way, the UE may communicate with improved spectral efficiency, may reduce channel congestion, may improve latency, and/or may conserve power and computing resources that may have otherwise been consumed to transmit multiple communication or to transmit over additional network resources.

Figure 6:
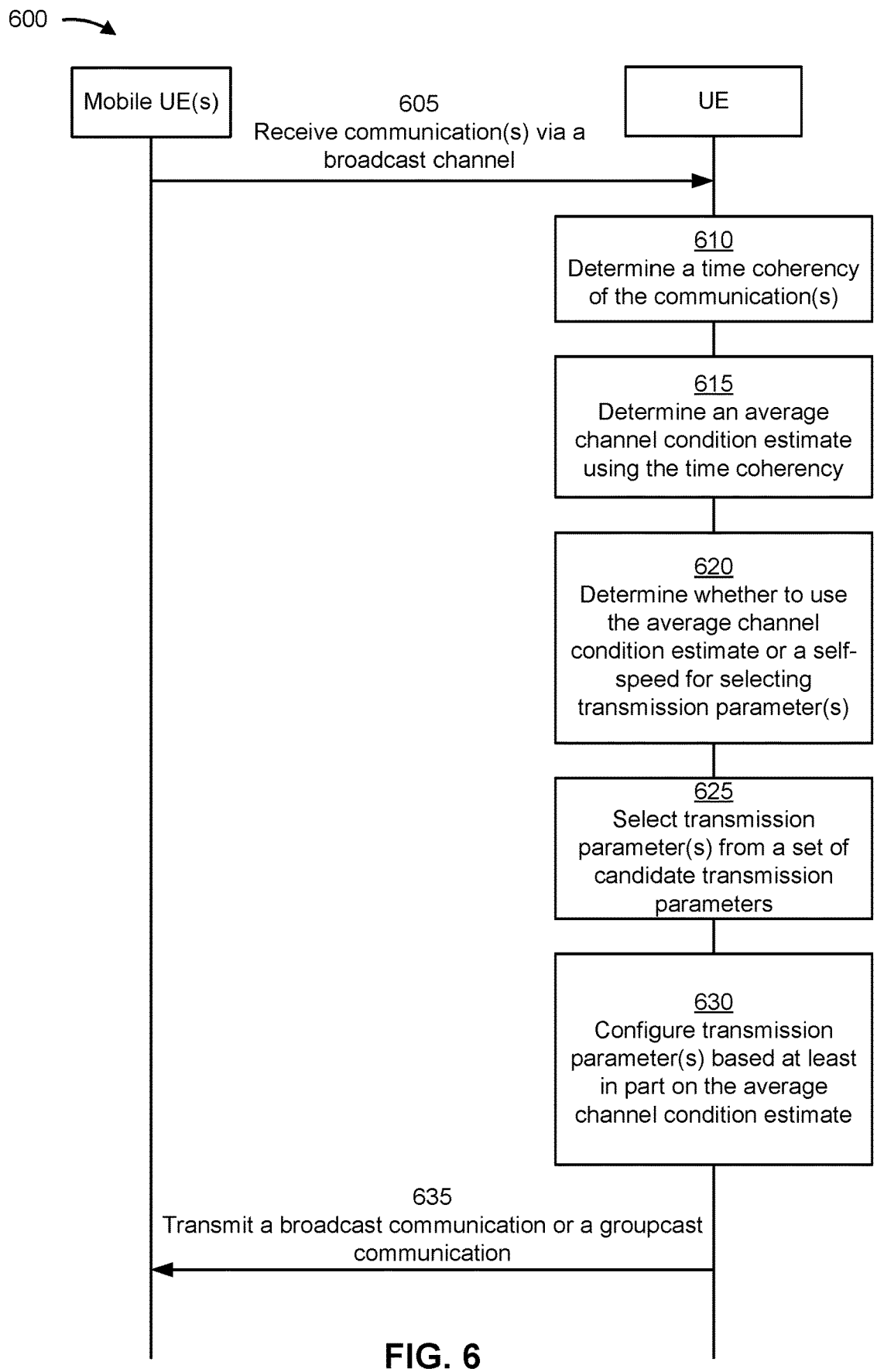
FIG. 6 is a diagram illustrating an example associated with transmitting a communication based at least in part on an average environmental channel estimation, in accordance with the present disclosure.

FIG. 6 is a diagram illustrating examples associated with transmitting a communication based at least in part on an average environmental channel estimation, in accordance with the present disclosure. As shown in FIG. 6, a UE (e.g., UE 120) may communicate with one or more mobile UEs (e.g., UEs 120). In some aspects, the UE and the one or more mobile UEs may be configured to be non-stationary. For example, the UE and/or the one or more mobile UEs may be included in, or associated with, a vehicle. In some aspects, the UE and the one or more mobile UEs may be part of a wireless network (e.g., wireless network 100), a C-V2X network, and/or a broadcast channel that is for (e.g., that supports) broadcast communications and/or groupcast communications for multiple mobile UEs (e.g. the UE and/or the one or more mobile UEs).

In some aspects, the UE may be configured to use an average channel condition estimate or a self-speed to determine one or more transmission parameters for transmitting a communication (e.g., a broadcast communication or a groupcast communication, among other examples) via the broadcast channel. For example, the UE may be configured via an SL-PSSCH-TxConfigList information element. The SL-PSSCH-TxConfigList information element may indicate that the UE is to select one or more transmission parameters (e.g., SL-PSSCH-TxParameters) based at least in part on whether the average channel estimate satisfies a threshold. In some aspects, the SL-PSSCH-TxConfigList information element may indicate that the UE is to select one or more transmission parameters from a set of candidate transmission parameters based at least in part on which threshold, of a set of thresholds associated with the set of candidate transmission parameters, the average channel estimate satisfies.

In some aspects, the SL-PSSCH-TxConfigList information element may indicate conditions for using the average channel condition estimate instead of the self-speed to determine the one or more transmission parameters. For example, the conditions may include a threshold number of received communications during a time window, a threshold self-speed (e.g., a relatively low self-speed may render a calculation of average channel condition estimate unnecessary), and/or capabilities (e.g., resources) of the UE required to perform the average channel condition estimate within a threshold amount of time.

As shown by reference number 605, the UE may receive one or more communications via the broadcast channel. In some aspects, the UE may receive the one or more communications via a single mobile UE or via multiple mobile UEs. In some aspects, the UE may receive the one or more communications over a time period to determine time coherency over the time period. In some aspects, the UE may be configured with an amount of time for the time period.

As shown by reference number 610, the UE may determine a time coherency of the one or more communications. In some aspects, the UE may determine the time coherency based at least in part on coherency between DMRSs of the one or more communications. For example, the time coherency may be based at least in part on a correlation of a first DMRS symbol of a first communication and a second DMRS symbol of the first communication or a second communication.

In some aspects, the time coherency may indicate a correlation value associated with communications received during the time period. In some aspects, the UE may determine whether a number of communications received during the time period satisfies a threshold associated with using the average channel condition estimate to select one or more transmission parameters for a broadcast or groupcast transmission.

As shown by reference number 615, the UE may determine an average channel condition estimate using the time coherency. In some aspects, the UE may determine the average channel condition estimate based at least in part on combining (e.g., averaging) time coherency values from one or more time periods or subsets of the one or more time periods. Additionally, or alternatively, the UE may determine the average channel condition estimate using a bandwidth coherency. The bandwidth coherency may indicate a frequency bandwidth over which received signals are expected to have correlated amplitude fading.

As shown by reference number 620, the UE may determine whether to use the average channel condition estimate or a self-speed for selecting the one or more transmission parameters. In some aspects, the UE may determine whether to use the average channel condition estimate based at least in part on capabilities of the UE, a self-speed of the UE, and/or a number of communications, associated with a determination of the average channel condition estimate, received within a threshold amount of time. For example, if the UE does not have sufficient available resources to determine the average channel condition estimate, the UE may determine to use the self-speed instead of the average channel condition estimate. If the UE has not received a number of communications that satisfies a threshold (e.g., an insufficient number of communications to reliably estimate the average channel condition estimate), the UE may determine to use the self-speed instead of the average channel condition estimate. If the UE has a self-speed that is below a threshold, the UE may determine that a set of transmission parameters associated with a relatively high throughput may be used, and that determining the average channel condition estimate may unnecessarily consume computing resources of the UE.

As shown by reference number 625, the UE may select the one or more transmission parameters from a set of candidate parameters. In some aspects, the UE may select the one or more transmission parameters from a set of candidate transmission parameters. The UE may make the selection based at least in part on a throughput associated with the one or more transmission parameters and the average channel condition estimate supporting the one or more transmission parameters. For example, the UE may select the one or more transmission parameters associated with a highest throughput that is supported by the average channel condition estimate. Support by the average channel condition estimate may be based at least in part on a table and/or another mapping between ranges of average channel condition estimates and MCS values.

In some aspects, the one or more transmission parameters include an MCS to use for transmission of the broadcast or groupcast communication. For example, the MCS may be selected from a set of candidate MCSs based at least in part on whether the average channel condition estimate indicates support for an amount of modulation and/or coding associated with the MCS.

As shown by reference number 630, the UE may configure the one or more transmission parameters based at least in part on the average channel condition estimate. For example, the UE may configure one or more components (e.g., baseband components, front end components, and/or radio frequency components, among other examples) based at least in part on the one or more transmission parameters. The one or more components may be configured to modulate, encode, and/or compress a broadcast communication or groupcast communication before transmission via an antenna group of the UE.

As shown by reference number 635, the UE may transmit the broadcast communication or the groupcast communication. The UE may transmit the broadcast communication or the groupcast communication using the one or more transmission parameters. In some aspects, the UE may transmit the broadcast communication or the groupcast communication without reception of feedback, such as an acknowledgment of reception from the one or more mobile devices. Based at least in part on not receiving feedback, the UE may be unable to modify the one or more transmission parameters based at least in part on unsuccessful reception. The UE may instead use a subsequent determination of the average channel condition estimate to determine whether to select a different set of the one or more transmission parameters.

Based at least in part on the UE selecting one or more transmission parameters based at least in part on the average channel condition estimate, the UE may select higher throughput transmission parameters when the average channel condition estimate indicates that the broadcast channel supports the higher throughput transmission parameters, even if a self-speed is relatively high. In this way, the UE may communicate with improved spectral efficiency, may reduce channel congestion, may improve latency, and/or may conserve power and computing resources that may have otherwise been consumed to transmit multiple communication or to transmit over additional network resources.

As indicated above, FIG. 6 is provided as an example. Other examples may differ from what is described with respect to FIG. 6.

Figure 7:
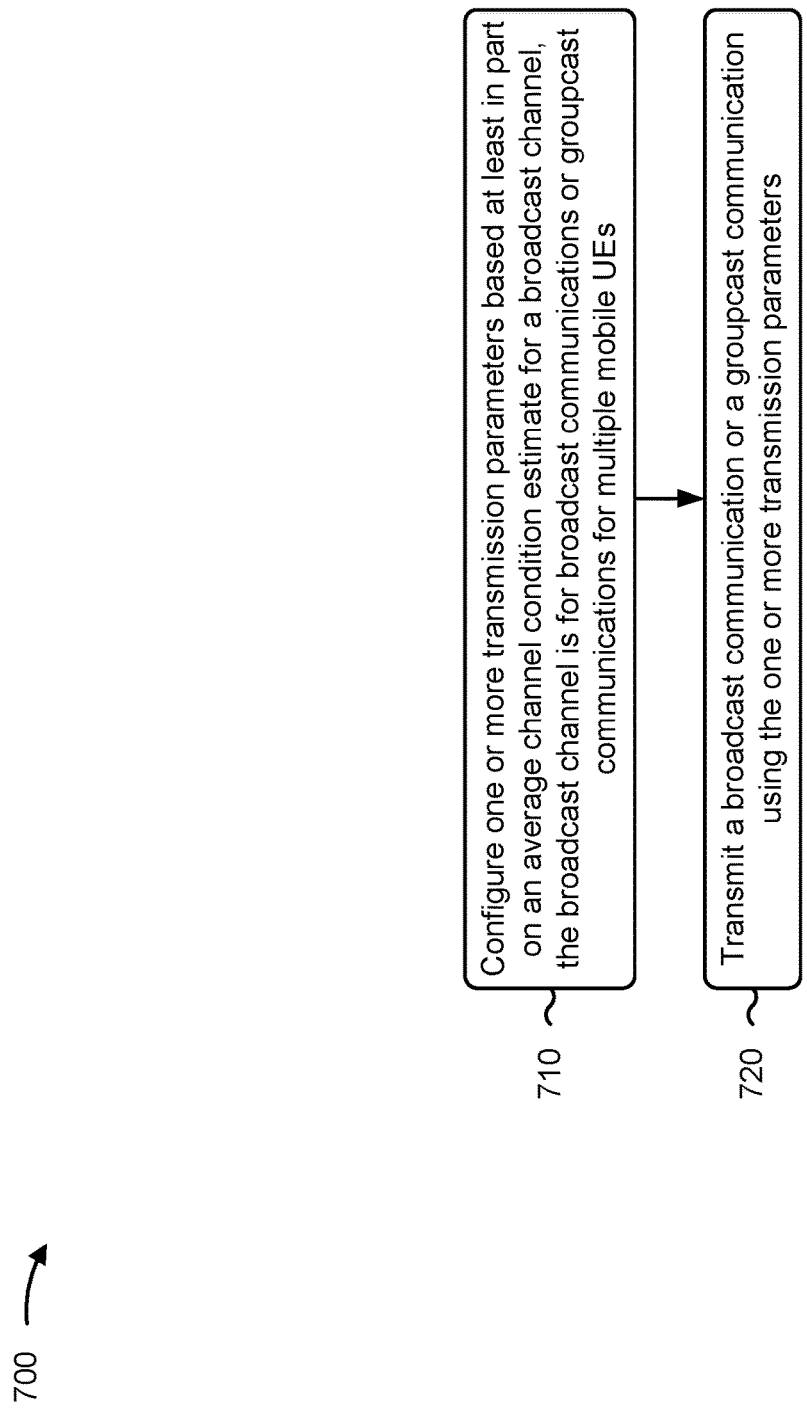
FIG. 7 is a diagram illustrating an example process associated with transmitting a communication based at least in part on an average environmental channel estimation, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for transmitting a communication based at least in part on an average environmental channel estimation.

As shown in FIG. 7, in some aspects, process 700 may include configuring one or more transmission parameters based at least in part on an average channel condition estimate for a broadcast channel, wherein the broadcast channel is for broadcast communications or groupcast communications for multiple mobile UEs (block 710). For example, the UE (e.g., using communication manager 808 and/or transmit component 804, depicted in FIG. 8) may configure one or more transmission parameters based at least in part on an average channel condition estimate for a broadcast channel, wherein the broadcast channel is for broadcast communications or groupcast communications for multiple mobile UEs, as described above.

As further shown in FIG. 7, in some aspects, process 700 may include transmitting a broadcast communication or a groupcast communication using the one or more transmission parameters (block 720). For example, the UE (e.g., using transmission component 804, depicted in FIG. 8) may transmit a broadcast communication or a groupcast communication using the one or more transmission parameters, as described above.

Process 700 may include additional aspects, such as any single aspect or any combination of aspects described below and/or in connection with one or more other processes described elsewhere herein.

In a first aspect, the one or more transmission parameters comprise a modulation and coding scheme for application to the broadcast communication or the groupcast communication.

In a second aspect, alone or in combination with the first aspect, process 700 includes receiving one or more communications via the broadcast channel, determining a time coherency associated with the one or more communications, and determining the average channel condition estimate based at least in part on the time coherency associated with the one or more communications.

In a third aspect, alone or in combination with one or more of the first and second aspects, reception of the one or more communications via the broadcast channel comprises one or more of receiving the one or more communications via a single mobile UE, receiving the one or more communications via a plurality of mobile UEs, or receiving the one or more communications via one or more mobile UEs within a group associated with a groupcast communication.

In a fourth aspect, alone or in combination with one or more of the first through third aspects, the determination of the time coherency is based at least in part on coherency between demodulation reference signals of the one or more communications.

In a fifth aspect, alone or in combination with one or more of the first through fourth aspects, process 700 includes selecting the one or more transmission parameters, from a set of candidate transmission parameters, based at least in part on a throughput associated with the one or more transmission parameters, and the average channel condition estimate supporting the one or more transmission parameters.

In a sixth aspect, alone or in combination with one or more of the first through fifth aspects, the broadcast channel is associated with a vehicle-to-everything (V2X) network.

In a seventh aspect, alone or in combination with one or more of the first through sixth aspects, process 700 includes determining to configure the one or more transmission parameters based at least in part on the average channel condition estimate, based at least in part on one or more of capabilities of the UE, a self-speed of the UE, or a number of communications, associated with a determination of the average channel condition estimate, received within a threshold amount of time.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
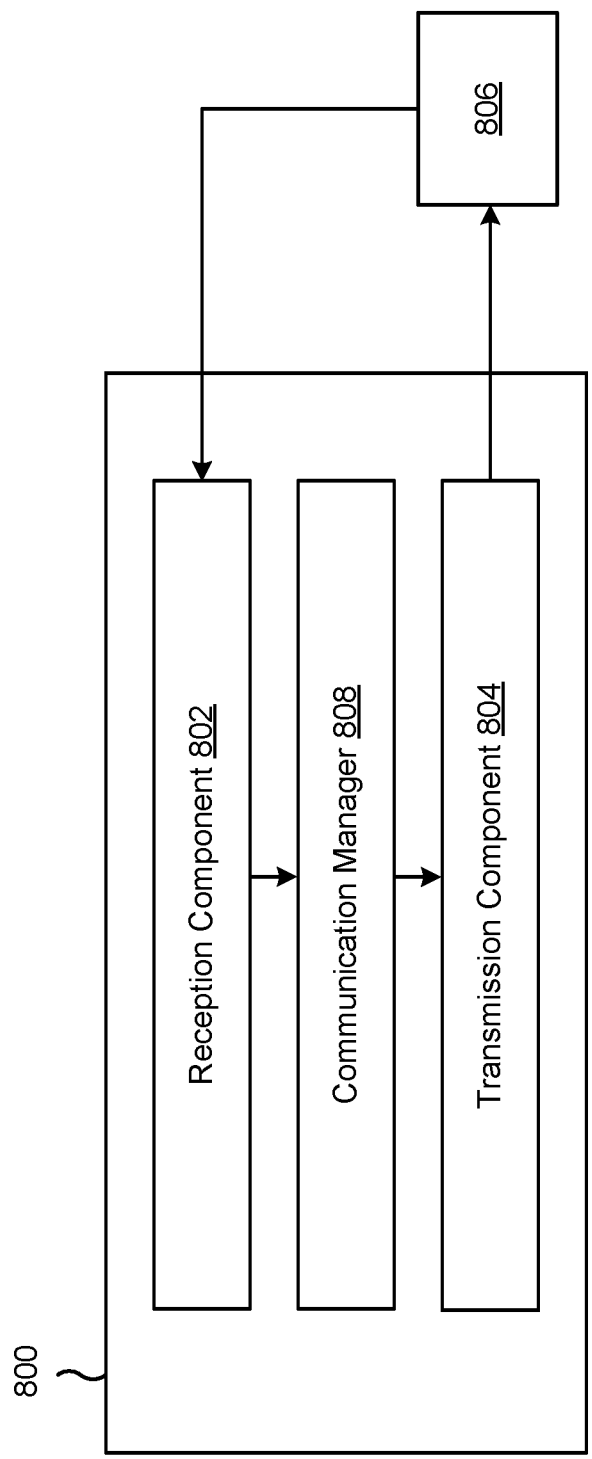
FIG. 8 is a block diagram of an example apparatus for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The communication manager 808 and/or the transmission component 804 may configure one or more transmission parameters based at least in part on an average channel condition estimate for a broadcast channel, wherein the broadcast channel is for broadcast communications or groupcast communications for multiple mobile UEs. The transmission component 804 may transmit a broadcast communication or a groupcast communication using the one or more transmission parameters.

The reception component 802 may receive one or more communications via the broadcast channel.

The communication manager 808 may determine a time coherency associated with the one or more communications.

The communication manager 808 may determine the average channel condition estimate based at least in part on the time coherency associated with the one or more communications.

The communication manager 808 may select the one or more transmission parameters, from a set of candidate transmission parameters, based at least in part on a throughput associated with the one or more transmission parameters, and the average channel condition estimate supporting the one or more transmission parameters.

The communication manager 808 may determine to configure the one or more transmission parameters based at least in part on the average channel condition estimate based at least in part on one or more of capabilities of the UE, a self-speed of the UE, or a number of communications, associated with a determination of the average channel condition estimate, received within a threshold amount of time.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: configuring one or more transmission parameters based at least in part on an average channel condition estimate for a broadcast channel, wherein the broadcast channel is for broadcast communications or groupcast communications for multiple mobile UEs; and transmitting a broadcast communication or a groupcast communication using the one or more transmission parameters.

Aspect 2: The method of Aspect 1, wherein the one or more transmission parameters comprise a modulation and coding scheme for application to the broadcast communication or the groupcast communication.

Aspect 3: The method of any of Aspects 1-2, further comprising: receiving one or more communications via the broadcast channel; determining a time coherency associated with the one or more communications; and determining the average channel condition estimate based at least in part on the time coherency associated with the one or more communications.

Aspect 4: The method of Aspect 3, wherein reception of the one or more communications via the broadcast channel comprises one or more of: receiving the one or more communications via a single mobile UE, receiving the one or more communications via a plurality of mobile UEs, or receiving the one or more communications via one or more mobile UEs within a group associated with a groupcast communication.

Aspect 5: The method of any of Aspects 3-4, wherein the determination of the time coherency is based at least in part on coherency between demodulation reference signals of the one or more communications.

Aspect 6: The method of any of Aspects 1-5, further comprising selecting the one or more transmission parameters, from a set of candidate transmission parameters, based at least in part on: a throughput associated with the one or more transmission parameters, and the average channel condition estimate supporting the one or more transmission parameters.

Aspect 7: The method of any of Aspects 1-6, wherein the broadcast channel is associated with a vehicle-to-everything (V2X) network.

Aspect 8: The method of any of Aspects 1-7, further comprising: determining to configure the one or more transmission parameters based at least in part on the average channel condition estimate based at least in part on one or more of: capabilities of the UE, a self-speed of the UE, or a number of communications, associated with a determination of the average channel condition estimate, received within a threshold amount of time.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the memory and the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining a time coherency associated with one or more communications, wherein the time coherency is based at least in part on a correlation between demodulation reference signals (DMRSs) associated with the one or more communications;
   determining an average channel condition estimate for a broadcast channel based at least in part on the time coherency, wherein the broadcast channel is for broadcast communications or groupcast communications for multiple mobile UEs;
   determining to use the average channel condition estimate for selecting one or more transmission parameters based at least in part on a number of communications, associated with a determination of the average channel condition estimate, received within a time window satisfying a threshold;
   configuring the one or more transmission parameters based at least in part on the average channel condition estimate; and
   transmitting a broadcast communication or a groupcast communication using the one or more transmission parameters.

2. The method of claim 1, wherein the one or more transmission parameters comprise a modulation and coding scheme for application to the broadcast communication or the groupcast communication.

3. The method of claim 1, further comprising:
   receiving the one or more communications via the broadcast channel.

4. The method of claim 3, wherein reception of the one or more communications via the broadcast channel comprises one or more of:
   receiving the one or more communications via a single mobile UE, receiving the one or more communications via a plurality of mobile UEs, or receiving the one or more communications via one or more mobile UEs within a group associated with the groupcast communication.

5. The method of claim 1, wherein the correlation between the DMRSs comprises a correlation of a first DMRS symbol of a first communication, of the one or more communications, and a second DMRS symbol of the first communication or a second communication of the one or more communications.

6. The method of claim 1, further comprising selecting the one or more transmission parameters, from a set of candidate transmission parameters, based at least in part on:

a throughput associated with the one or more transmission parameters, and the average channel condition estimate supporting the one or more transmission parameters.

7. The method of claim 1, wherein the broadcast channel is associated with a vehicle-to-everything (V2X) network.

8. The method of claim 1, wherein determining to use the average channel condition estimate for selecting the one or more transmission parameters further comprises:

determining to use the average channel condition estimate for selecting the one or more transmission parameters based at least in part on one or more of capabilities of the UE or a self-speed of the UE.

9. A user equipment (UE) for wireless communication, comprising:

one or more memories; and one or more processors, coupled to the one or more memories, configured to:

determine a time coherency associated with one or more communications, wherein the time coherency is based at least in part on a correlation between demodulation reference signals (DMRSs) associated with the one or more communications;

determine an average channel condition estimate for a broadcast channel based at least in part on the time coherency, wherein the broadcast channel is for broadcast communications or groupcast communications for multiple mobile UEs;

determine to use the average channel condition estimate for selecting one or more transmission parameters based at least in part on a number of communications, associated with a determination of the average channel condition estimate, received within a time window satisfying a threshold;

configure the one or more transmission parameters based at least in part on the average channel condition estimate; and transmit a broadcast communication or a groupcast communication using the one or more transmission parameters.

10. The UE of claim 9, wherein the one or more transmission parameters comprise a modulation and coding scheme for application to the broadcast communication or the groupcast communication.

11. The UE of claim 9, wherein the one or more processors are further configured to:

receive the one or more communications via the broadcast channel.

12. The UE of claim 11, wherein the one or more processors, to receive the one or more communications via the broadcast channel, are configured to:

receive the one or more communications via a single mobile UE, receive the one or more communications via a plurality of mobile UEs, or receive the one or more communications via one or more mobile UEs within a group associated with the groupcast communication.

13. The UE of claim 9, wherein the correlation between the DMRSs comprises a correlation of a first DMRS symbol of a first communication, of the one or more communications, and a second DMRS symbol of the first communication or a second communication of the one or more communications.

14. The UE of claim 9, wherein the one or more processors are further configured to select the one or more transmission parameters, from a set of candidate transmission parameters, based at least in part on:

a throughput associated with the one or more transmission parameters, and the average channel condition estimate supporting the one or more transmission parameters.

15. The UE of claim 9, wherein the broadcast channel is associated with a vehicle-to-everything (V2X) network.

16. The UE of claim 9, wherein the one or more processors, to determine to use the average channel condition estimate for selecting the one or more transmission parameters, are further configured to:

determine to use the average channel condition estimate for selecting the one or more transmission parameters based at least in part on one or more of capabilities of the UE or a self-speed of the UE.

17. A non-transitory computer-readable medium storing a set of instructions for wireless communication, the set of instructions comprising:

one or more instructions that, when executed by one or more processors of a user equipment (UE), cause the UE to:

determine a time coherency associated with one or more communications, wherein the time coherency is based at least in part on a correlation between demodulation reference signals (DMRSs) associated with the one or more communications;

determine an average channel condition estimate for a broadcast channel based at least in part on the time coherency, wherein the broadcast channel is for broadcast communications or groupcast communications for multiple mobile UEs;

determine to use the average channel condition estimate for selecting one or more transmission parameters based at least in part on a number of communications, associated with a determination of the average channel condition estimate, received within a time window satisfying a threshold;

configure the one or more transmission parameters based at least in part on the average channel condition estimate; and transmit a broadcast communication or a groupcast communication using the one or more transmission parameters.

18. The non-transitory computer-readable medium of claim 17, wherein the one or more transmission parameters comprise a modulation and coding scheme for application to the broadcast communication or the groupcast communication.

19. The non-transitory computer-readable medium of claim 17, wherein the one or more instructions further cause the UE to:

receive the one or more communications via the broadcast channel.

20. The non-transitory computer-readable medium of claim 19, wherein the one or more instructions, that cause the UE to receive the one or more communications via the broadcast channel, cause the UE to:
  receive the one or more communications via a single mobile UE,
  receive the one or more communications via a plurality of mobile UEs, or
  receive the one or more communications via one or more mobile UEs within a group associated with the groupcast communication.

21. The non-transitory computer-readable medium of claim 17, wherein the broadcast channel is associated with a vehicle-to-everything (V2X) network.

22. The non-transitory computer-readable medium of claim 17, wherein the one or more instructions further cause the UE to select the one or more transmission parameters, from a set of candidate transmission parameters, based at least in part on:
  a throughput associated with the one or more transmission parameters, and
  the average channel condition estimate supporting the one or more transmission parameters.

23. The non-transitory computer-readable medium of claim 17, wherein the one or more instructions, that cause the UE to determine to use the average channel condition estimate for selecting the one or more transmission parameters, further cause the UE to:
  determine to use the average channel condition estimate for selecting the one or more transmission parameters based at least in part on one or more of capabilities of the UE or a self-speed of the UE.

24. An apparatus for wireless communication, comprising:
  means for determining a time coherency associated with one or more communications, wherein the time coherency is based at least in part on a correlation between demodulation reference signals (DMRSs) associated with the one or more communications;
  means for determining an average channel condition estimate for a broadcast channel based at least in part on the time coherency, wherein the broadcast channel is for broadcast communications or groupcast communications for multiple mobile apparatuses;
  means for determining to use the average channel condition estimate for selecting one or more transmission parameters based at least in part on a number of communications, associated with a determination of the average channel condition estimate, received within a time window satisfying a threshold;
  means for configuring the one or more transmission parameters based at least in part on the average channel condition estimate; and
  means for transmitting a broadcast communication or a groupcast communication using the one or more transmission parameters.

25. The apparatus of claim 24, wherein the one or more transmission parameters comprise a modulation and coding scheme for application to the broadcast communication or the groupcast communication.

26. The apparatus of claim 24, further comprising:
  means for receiving the one or more communications via the broadcast channel.

27. The apparatus of claim 26, the means for receiving the one or more communications via the broadcast channel comprises:
  means for receiving the one or more communications via a single mobile apparatus,
  means for receiving the one or more communications via a plurality of mobile apparatuses, or
  means for receiving the one or more communications via one or more mobile apparatuses within a group associated with the groupcast communication.

28. The apparatus of claim 24, wherein the broadcast channel is associated with a vehicle-to-everything (V2X) network.

29. The apparatus of claim 24, further comprising means for selecting the one or more transmission parameters, from a set of candidate transmission parameters, based at least in part on:
  a throughput associated with the one or more transmission parameters, and
  the average channel condition estimate supporting the one or more transmission parameters.

30. The apparatus of claim 24, wherein the means for determining to use the average channel condition estimate for selecting the one or more transmission parameters further comprises:
  means for determining to use the average channel condition estimate for selecting the one or more transmission parameters based at least in part on one or more of capabilities of the apparatus or a self-speed of the apparatus.

* * * * *